United States Patent
Pei et al.

(10) Patent No.: US 10,161,798 B2
(45) Date of Patent: Dec. 25, 2018

(54) INTEGRATED POLARIMETER IN AN OPTICAL LINE SYSTEM

(71) Applicant: Ciena Corporation, Hanover, MD (US)

(72) Inventors: Yinqing Pei, Kanata (CA); Jean-Luc Archambault, Ottawa (CA); David W. Boertjes, Nepean (CA); David R. Doucet, Almonte (CA)

(73) Assignee: Ciena Corporation, Hanover, MD (US)

( * ) Notice: Subject to any disclaimer, the term of this patent is extended or adjusted under 35 U.S.C. 154(b) by 204 days.

(21) Appl. No.: 15/177,982

(22) Filed: Jun. 9, 2016

(65) Prior Publication Data

US 2017/0356805 A1    Dec. 14, 2017

(51) Int. Cl.
*G01J 4/00* (2006.01)
*H01S 3/00* (2006.01)
*G02B 6/42* (2006.01)

(52) U.S. Cl.
CPC .............. *G01J 4/00* (2013.01); *G02B 6/4216* (2013.01); *H01S 3/0007* (2013.01)

(58) Field of Classification Search
CPC ................................................ G01J 4/00–4/04
See application file for complete search history.

(56) References Cited

U.S. PATENT DOCUMENTS

| | | | |
|---|---|---|---|
| 5,815,270 A | 9/1998 | Lee | |
| 7,106,979 B1 | 9/2006 | Taylor | |
| 7,155,128 B2 | 12/2006 | Roberts et al. | |
| 7,305,183 B2 | 12/2007 | Roberts et al. | |
| 7,693,357 B2 | 4/2010 | El Fellah et al. | |
| 7,693,359 B2 | 4/2010 | Murphy et al. | |
| 7,756,421 B2 | 7/2010 | Roberts et al. | |
| 8,233,788 B2 | 7/2012 | Murphy et al. | |
| 8,345,238 B2 | 1/2013 | Yao | |
| 8,364,036 B2 | 1/2013 | Boertjes et al. | |
| 8,594,499 B1 | 11/2013 | Roberts et al. | |
| 8,958,696 B2 | 2/2015 | Boertjes et al. | |
| 2002/0149823 A1* | 10/2002 | Bergano ............. | H04B 10/2569 398/20 |
| 2012/0224846 A1 | 9/2012 | Swanson et al. | |

(Continued)

OTHER PUBLICATIONS

Qin et al., "New method for lightning location using optical ground wire," Chinese Optic Letters, vol. 4, No. 12, Dec. 10, 2006, pp. 712-714.

(Continued)

*Primary Examiner* — Nathan M Cors
(74) *Attorney, Agent, or Firm* — Clements Bernard Walker PLLC; Christopher L. Bernard; Lawrence A. Baratta, Jr.

(57) ABSTRACT

A polarimeter system integrated into an optical line system includes a transmitter coupled to a transmit filter communicatively coupled to an output port in an optical line device, wherein the transmitter is configured to generate a polarization probe signal, and wherein a wavelength of the polarization probe signal is configured to operate in-service with traffic-bearing channels on the output port; and a polarimeter receiver coupled to a receive filter communicatively coupled to an input port in the optical line device, wherein the polarimeter receiver is configured to vary arrangement of input light from the filter and to measure various outputs of the varied arrangement to derive measurement of State of Polarization (SOP) of the input light.

17 Claims, 11 Drawing Sheets

(56) References Cited

U.S. PATENT DOCUMENTS

| | | |
|---|---|---|
| 2013/0051809 A1 | 2/2013 | Mehrvar et al. |
| 2014/0071436 A1* | 3/2014 | Cyr ..................... G01N 21/21 356/73.1 |
| 2014/0077971 A1 | 3/2014 | Archambault et al. |
| 2014/0112660 A1 | 4/2014 | Al Sayeed et al. |
| 2014/0328583 A1 | 11/2014 | Al Sayeed et al. |
| 2015/0131988 A1 | 5/2015 | Alfiad et al. |
| 2017/0328809 A1* | 11/2017 | Chen ................. G01M 11/3127 |

OTHER PUBLICATIONS

Kozlov et al., "Nonlinear repolarization dynamics in optical fibers: transient polarization attraction," HAL Archives-Ouvertes, Nov. 7, 2011, pp. 1-40.

Kramer et al., "Fiber Optic Sensor Network for Lightning Impact Localization and Classification in Wind Turbines," 2006 IEEE International Conference on Multisensor Fusion and Integration for Intelligent Systems, Sep. 3-6, 2006, pp. 1-6.

Reimer, "Simulation Methods for the Temporal and Frequency Dynamics of Optical Communication Systems," A thesis presented to the University of Waterloo in fulfilment of the thesis requirement for the degree of Doctor of Philosophy in Physics, 2012, pp. 1-199.

Guasoni et al., "Fast and Chaotic Fiber-Based Nonlinear Polarization Scrambler," pp. 1-11.

\* cited by examiner

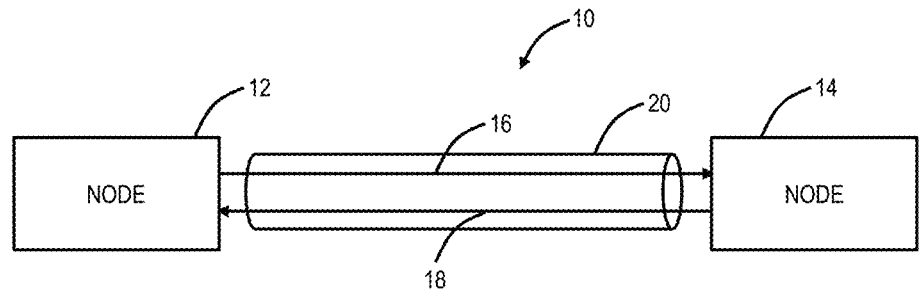
FIG. 1
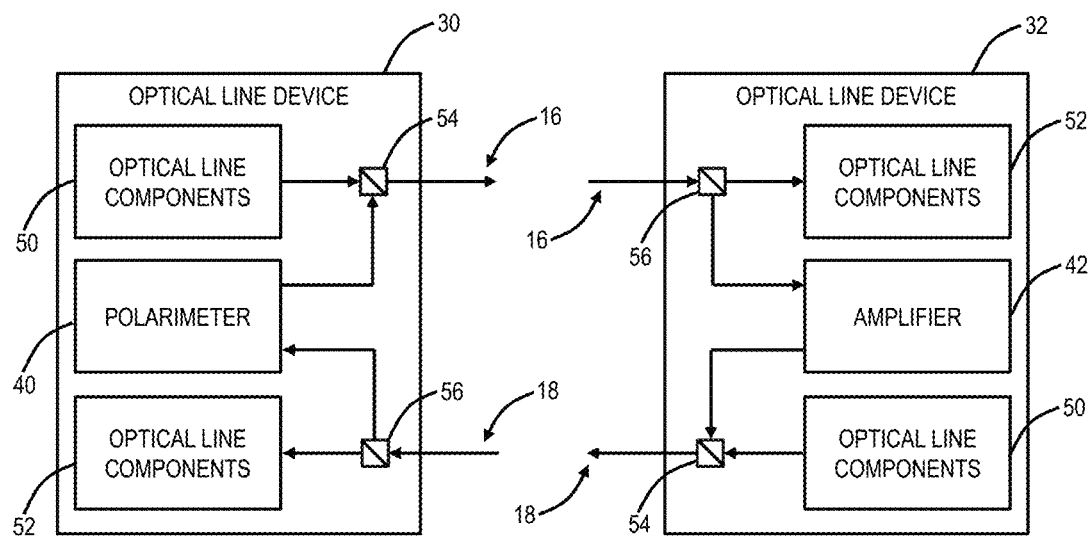
FIG. 2  FIG. 3

INTEGRATED POLARIMETER IN AN OPTICAL LINE SYSTEM

FIELD OF THE DISCLOSURE

The present disclosure generally relates to fiber optic systems and methods. More particularly, the present disclosure relates to an integrated polarimeter in an optical line system.

BACKGROUND OF THE DISCLOSURE

As bandwidth continues to grow, capacity is being stretched in fiber optic networks (Wavelength Division Multiplexing (WDM), optical line systems, etc.). Various advanced techniques are used to provide additional bandwidth including advanced coherent modulation techniques, polarization multiplexing, flexible grid spacing, and the like in optical line systems. With these advanced techniques, optical line systems suffer new degrees of susceptibility to transients on a time varying optical channel, including polarization transients, etc. As described herein, an State of Polarization (SOP) transient source causes an SOP transient which is anything that causes quick changes in the SOP of signals on an optical fiber. Coherent optical line systems are configured to track SOP changes as part of normal operation, but when quick SOP transients occur, these can be outside the tracking ability, leading to errors, loss of framing, etc. Example SOP transient sources can include, without limitation, external vibrations (e.g., bridges, roads, railroads, wind, etc.), bad splices on the optical fiber, weather (e.g., lightning, wind, etc.), or the like. Usually, SOP transient sources behave unpredictably and from unknown locations in the fiber. Further, SOP transient sources can be time specific, seasonal, etc. Thus, it is important in optical line systems to have some technique for real-time, in-service measurement. SOP transients can be particularly problematic with coherent transmission, and especially difficult to localize/isolate given their nature in general. An application using a polarimeter with an optical line system for SOP transient localization is described in commonly-assigned U.S. patent application Ser. No. 14/865,802 filed Sep. 25, 2015, and entitled "SYSTEMS AND METHODS USING A POLARIMETER TO LOCALIZE STATE OF POLARIZATION TRANSIENTS ON OPTICAL FIBERS," the contents of which are incorporated by reference.

Polarimeters are polarization measurement devices configured to measure the polarization state of an optical signal. Conventionally, in optical line systems (e.g., WDM, Dense WDM, etc.), polarimeters are external test devices which connect to the optical line system, i.e., polarimeters are not integrated devices. Accordingly, conventional polarimeters do not operate in-service, i.e., with traffic-bearing signals active on the optical line system. Further, conventional polarimeters rely on free space optics which is not amenable to integration with fiber components (i.e., non-free space optics). Conventional polarimeters require special design of bulk free space optics components and/or special coupling functions of an optical fiber leading to costly and bulky implementations. Finally, conventional polarimeters are cost prohibitive for optical line system applications as well as complex providing vast more information than necessary for such optical line system applications, i.e., only SOP tracking is required to monitor the health of an optical fiber.

It would be advantageous to provide a polarimeter integrated with an optical line system optimized to provide functionality necessary for monitoring the health of the optical line system.

BRIEF SUMMARY OF THE DISCLOSURE

In an exemplary embodiment, a polarimeter system integrated into an optical line system includes a transmitter coupled to a transmit filter communicatively coupled to an output port in an optical line device, wherein the transmitter is configured to generate a polarization probe signal, and wherein a wavelength of the polarization probe signal is configured to operate in-service with traffic-bearing channels on the output port; and a polarimeter receiver coupled to a receive filter communicatively coupled to an input port in the optical line device, wherein the polarimeter receiver is configured to vary arrangement of input light of a corresponding polarization probe signal from the receive filter and to measure various outputs of the varied arrangement to derive a measurement of State of Polarization (SOP) of the input light. The polarimeter system can be located at a first node in the optical line system, and wherein the polarimeter system can further include at a second node, opposite the first node and communicatively coupled thereto by two fibers: an amplifier coupled to a second receive filter in a second optical line device, wherein the amplifier is configured to receive the polarization probe signal from the second receive filter, amplify the polarization probe signal, and loop back the polarization probe signal to the polarimeter receiver via a second transmit filter. The optical line device can include one or more of a Raman amplifier module, an Erbium Doped Fiber Amplifier (EDFA) module, an Optical Supervisory Channel (OSC) module, an Optical Time Domain Reflectometer (OTDR) module, a modem, and a pluggable module adapted to plug into any of the foregoing modules. The polarimeter system can operate continuously while the optical line system is in-service to collect SOP data over time and to detect fast SOP transients on a specific span in the optical line system.

The polarimeter receiver can be implemented with a plurality of passive fiber optic components to provide the varied arrangement and a plurality of detectors to measure the various outputs. The plurality of passive fiber optic components can include a Polarization Maintaining (PM) coupler configured to receive the input light, PM fiber coupled to outputs of the PM coupler, a 45° alignment associated with one output of the PM coupler, and Polarization Beam Splitters (PBSs) coupled to four detectors for measuring $i_1$, $i_2$, $i_3$, and $i_4$. The plurality of passive fiber optic components can include a Polarization Maintaining (PM) coupler configured to receive the input light, PM fiber coupled to outputs of the PM coupler, a 45° alignment associated with one output of the PM coupler, polarizers coupled to two detectors for measuring $i_1$ and $i_3$, and another detector coupled to an input to measure total input power for estimation of $i_2$ and $i_4$ based on the total power and the measurement of $i_1$ and $i_3$. The optical line device can include the polarimeter system and an Optical Time Domain Reflectometer (OTDR), wherein the transmitter is shared between the polarimeter system and the OTDR based on configuration. The wavelength of the polarization probe signal can be outside of the C-band, greater than 1500 nm to avoid Raman pump lasers, and different from wavelengths for Optical Supervisory Channels (OSCs).

In another exemplary embodiment, a polarimeter method with a polarimeter integrated into an optical line system includes providing a transmitter coupled to a filter communicatively coupled to an output port in an optical line device, wherein the transmitter is configured to generate a polarization probe signal, and wherein a wavelength of the polarization probe signal is configured to operate in-service with traffic-bearing channels on the output port; and providing a polarimeter receiver coupled to a filter communicatively coupled to an input port in the optical line device, wherein the polarimeter receiver is configured to vary arrangement of input light of a corresponding polarization probe signal from the filter and to measure various outputs of the varied arrangement to derive a measurement of State of Polarization (SOP) of the input light. The polarimeter system can be located at a first node in the optical line system, and wherein the polarimeter method can further include at a second node, opposite the first node and communicatively coupled thereto by two fibers: providing an amplifier coupled to a second receive filter in a second optical line device, wherein the amplifier is configured to receive the polarization probe signal from the second receive filter, amplify the polarization probe signal, and loop back the polarization probe signal to the polarimeter receiver via a second transmit filter. The optical line device can include one or more of a Raman amplifier module, an Erbium Doped Fiber Amplifier (EDFA) module, an Optical Supervisory Channel (OSC) module, an Optical Time Domain Reflectometer (OTDR) module, a modem, and a pluggable module adapted to plug into any of the foregoing modules. The polarimeter system can operate continuously while the optical line system is in-service to collect SOP data over time and to detect fast SOP transients on a specific span in the optical line system.

The polarimeter receiver can be implemented with a plurality of passive fiber optic components to provide the varied arrangement and a plurality of detectors to measure the various outputs. The plurality of passive fiber optic components can include a Polarization Maintaining (PM) coupler configured to receive the input light, PM fiber coupled to outputs of the PM coupler, a 45° alignment associated with one output of the PM coupler, and Polarization Beam Splitters (PBSs) coupled to four detectors for measuring $i_1$, $i_2$, $i_3$, and $i_4$. The plurality of passive fiber optic components can include a Polarization Maintaining (PM) coupler configured to receive the input light, PM fiber coupled to outputs of the PM coupler, a 45° alignment associated with one output of the PM coupler, polarizers coupled to two detectors for measuring $i_1$ and $i_3$, and another detector coupled to an input to measure total input power for estimation of $i_2$ and $i_4$ based on the total power and the measurement of $i_1$ and $i_3$. The optical line device can include the polarimeter system and an Optical Time Domain Reflectometer (OTDR), wherein the transmitter is shared between the polarimeter system and the OTDR based on configuration. The wavelength of the polarization probe signal cam ne outside of the C-band, greater than 1500 nm to avoid Raman pump lasers, and different from wavelengths for Optical Supervisory Channels (OSCs).

In a further exemplary embodiment, an optical line device configured to operate in an optical line system includes optical line components communicatively coupled to an output port via a transmit filter and an input port via a receive filter; and a polarimeter system including a transmitter coupled to the transmit filter, wherein the transmitter is configured to generate a polarization probe signal, and wherein a wavelength of the polarization probe signal is configured to operate in-service with traffic-bearing channels on the output port; and a polarimeter receiver coupled to the receive filter, wherein the polarimeter receiver is configured to vary arrangement of input light of a corresponding polarization probe signal from the receive filter and to measure various outputs of the varied arrangement to derive a measurement of State of Polarization (SOP) of the input light. The optical line components can be configured to perform one or more of a Raman amplifier, an Erbium Doped Fiber Amplifier (EDFA) module, an Optical Supervisory Channel (OSC) module, an Optical Time Domain Reflectometer (OTDR) module, a modem, and a pluggable module adapted to plug into any of the foregoing modules.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of an optical network with two nodes interconnected by fibers each contained in a bundle;

FIG. 2 is a block diagram of an optical line device with a polarimeter integrated therein;

FIG. 3 is a block diagram of an optical line device with an amplifier for operation with the optical line device of FIG. 2 in a loop-backed polarimeter configuration;

DETAILED DESCRIPTION OF THE DISCLOSURE

Figure 4:
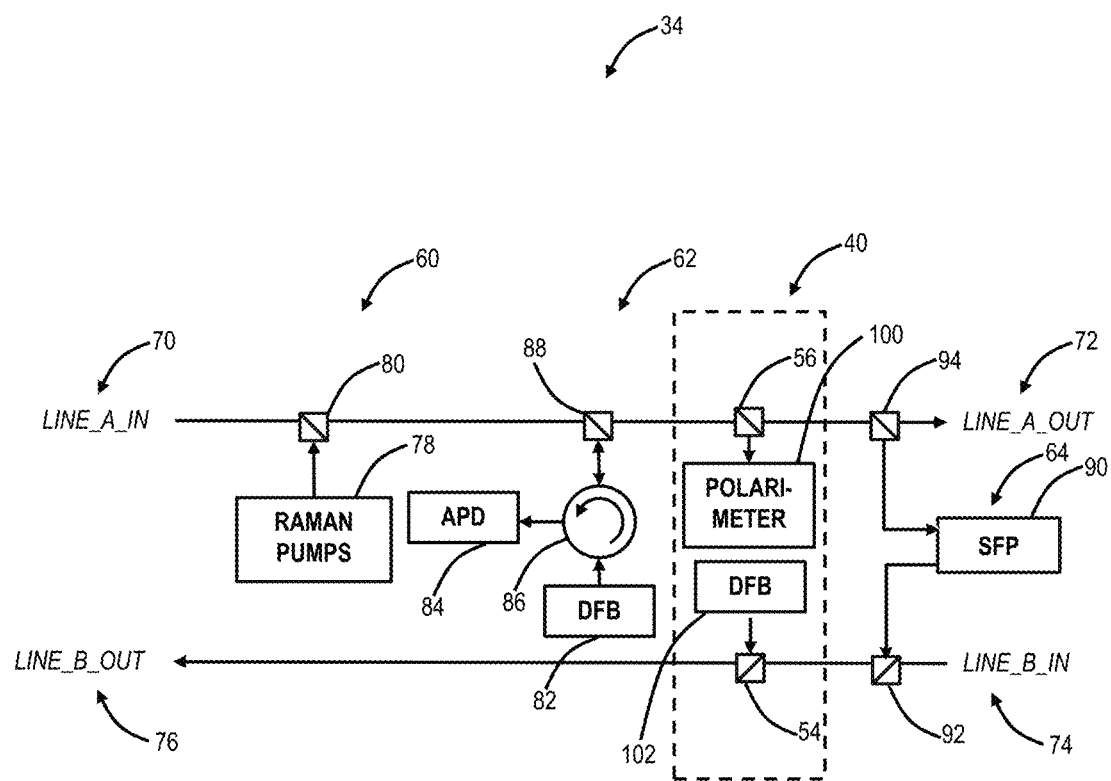
FIG. 4 is a block diagram of an optical line device which is a Raman amplifier with the polarimeter integrated therein.

Again, in various exemplary embodiments, the present disclosure relates to an integrated polarimeter in an optical line system. The integrated polarimeter provides the functionality needed in optical line applications including detection of SOP transients, localization of the SOP transients to either an approximate distance or a span, overall health monitoring of the optical fiber, and the like. The integrated polarimeter is designed with "off-the-shelf" passive fiber optic components, lending itself to integration with existing components in the optical line system, such as in a line card, line module, pluggable module, hardware device, or the like. The integrated polarimeter includes a source laser and various exemplary embodiments for a detector based on Polarization Maintaining (PM) couplers and fibers, polarizers, and Polarization Beam Splitters (PBSs) coupled to detectors. Accordingly, the integrated polarimeter can collect real-time SOP transient data over individual spans in an optical network, in real-time while operating in-service without disrupting traffic-bearing channels. Such real-time operation provides operators a wealth of data which can be used for various network optimization techniques such as monitoring historical data to determine optimum modem types and performance on particular spans, to determine decisions about restoration events, to troubleshoot and identify fast SOP transients to specific spans or location, and the like.

Optical Line System

Referring to FIG. 1, in an exemplary embodiment, a network diagram illustrates an optical network 10 with two nodes 12, 14 interconnected by fibers 16, 18 each contained in a bundle 20. The optical nodes 12, 14 connected to one another over the fibers 16, 18 can be referred to as an optical line system and represents a single span. Of course, those of ordinary skill in the art will recognize the optical network 10 can include additional nodes, fibers, bundles, spans, optical amplifier sites, add/drop sites, etc. The nodes 12, 14 can be any type of optical network element including, without limitation, Wavelength Division Multiplexing (WDM) terminals, Reconfigurable Optical Add/Drop Multiplexers (ROADMs), switches, routers, cross-connects, etc. In an exemplary embodiment, the nodes 12, 14 have optical transceivers, transponders, or modems (collectively referred to herein as "modems") to provide transmission of traffic-bearing channels. The nodes 12, 14 can further include optical amplifiers such as Erbium Doped Fiber Amplifiers (EDFAs), Raman Amplifiers, or the like. The nodes 12, 14 can include multiplexer and demultiplexer components such as splitters, combiners, Wavelength Selective Switches, etc. to perform WDM of multiple traffic-bearing channels from multiple modems. Also, the nodes 12, 14 can include various other components such as Optical Supervisory Channels (OSCs) for management communication between optical nodes such as optical amplifiers, Optical Time Domain Reflectometers (OTDR) to measure back reflections over the fibers 16, 18, Raman amplifiers, and the like.

The various aforementioned components in the nodes 12, 14 can be physically realized in hardware components in a network element forming the node 12, 14. The hardware components can be included in line cards, line modules, pluggable modules, "pizza boxes" which are small-form-factor units such as 1-2 Rack Units (RU) high, or the like. The hardware components are generally optically connected to one another for ultimate transmission and reception over the fibers 16, 18. As described herein, an optical line device is a hardware device which is part of the nodes 12, 14 and integrated therein. Examples of optical line devices can include Raman amplifier modules, EDFA amplifier modules, OSC modules, OTDR modules, modems, and the like. In various exemplary embodiments, the integrated polarimeter is part of an optical line device in the nodes 12, 14 capable of in-service polarimeter measurements of the fibers 16, 18 while the traffic-bearing channels are operating thereon. The integrated polarimeter is physically integrated with the optical line device as well as controlled by software in the nodes 12, 14 and the overall optical line system, providing measurements and alerts to the nodes 12, 14 and to associated management systems, control planes, etc. Those of ordinary skill in the art will recognize various different types of optical line systems and optical line devices are known, the optical network 10 is described for illustration purposes, and the integrated polarimeter contemplates integration with any type of optical line system and optical line device.

The modems can include Non-Return-to-Zero (NRZ), duobinary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of optical modulation and detection technique. Importantly, as the modems utilize advanced coherent modulation/demodulation techniques, they are susceptible to SOP transients. In coherent optical systems, optical receivers in the modems must track the SOP of the optical signal. In some instances, very fast SOP transients have been known to occur, which can impair receiver performance or in the worst case cause bit errors. Debugging each of these links after the fact is very time-consuming. Thus, the integrated polarimeter can provide significant operational data related to SOP transients on the fibers 16, 18 which is useful with advanced coherent modulation/demodulation techniques. The integrated polarimeter provides real-time, in-service SOP transient tracking. With the integrated polarimeter in multiple spans in the optical network 10 can complement OTDR data to give the network operator a complete view of the quality of the fibers 16, 18 in real-time.

The nodes 12, 14 can communicate to a management system such as a Network Management System (NMS), an Element Management System (EMS), a Path Computation Element (PCE), a Software Defined Networking (SDN) controller, a control plane, or the like. SOP transient statistics from the integrated polarimeter can be provided to the management system and used for 1) troubleshooting to identify and localize the cause of errors, 2) making decisions about what types of modems to deploy or in the case on programmable modems, which type of configuration (modulation scheme, spectrum amount, etc.), 3) optimize the performance of modems based on the required SOP tracking speed of the fibers 16, 18, 4) making decisions when rerouting traffic during network restoration (e.g., avoiding problematic spans at the time of rerouting), and the like.

Integrated Polarimeter in an Optical Line Device/System

Figure 5:
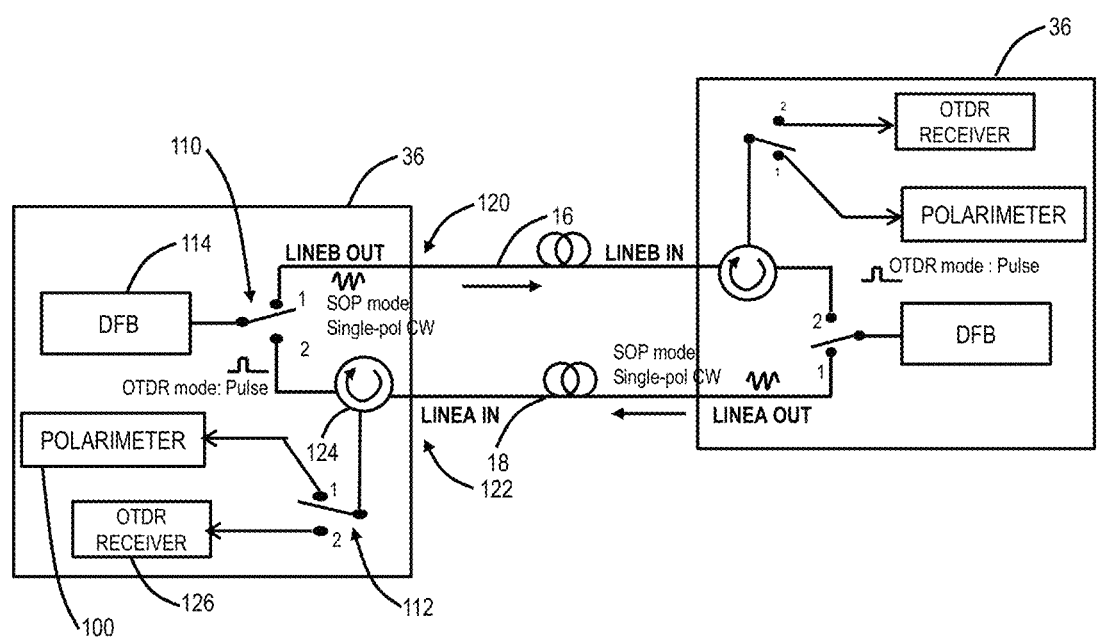
FIG. 5 is a block diagram of an optical line device which can be a pluggable module or the like with the polarimeter integrated therein sharing components with an OTDR.

Referring to FIGS. 2-5, in exemplary embodiments, block diagrams illustrate a polarimeter configuration embedded in optical line devices 30, 32, 34, 36. FIG. 2 illustrates an optical line device 30 with a polarimeter 40 integrated therein, FIG. 3 illustrates an optical line device 32 with an amplifier 42 for operation with the optical line device 30 in a loop-backed polarimeter configuration, FIG. 4 illustrates an optical line device 34 which is a Raman amplifier with the polarimeter 40 integrated therein, and FIG. 5 illustrates an optical line device 36 which can be a pluggable module or the like with the polarimeter 40 integrated therein sharing components with an OTDR 44. Again, FIGS. 2-5 are exemplary embodiments of integration of the polarimeter 40 with optical line systems and the like; those of ordinary skill in the art will recognize the integrated polarimeter contemplates integration with any optical line system, optical line device, etc. to provide real-time, in-service operation.

In FIG. 2, the optical line device 30 includes the polarimeter 40 integrated therein, supporting the transmission of a polarimeter probe signal on the fiber 16 and reception of a corresponding polarimeter probe signal on the fiber 18. In an exemplary embodiment, the optical line device 30 can be used at various nodes in the optical network 10 to support polarimeter probe signals on both the fibers 16, 18. In FIG. 3, the optical line device 32 includes the amplifier 42 integrated therein which is configured to receive the polarimeter probe signal on the fiber 16, to amplify the polarimeter probe signal, and to loop back the polarimeter probe signal on the fiber 18. Thus, in one exemplary embodiment, the optical line device 30 can be at opposing nodes 12, 14 to support a single polarimeter probe signal on each fiber 16, 18, and in another exemplary embodiment, the optical line device 30 can be at the node 12 and the optical line device 32 can be at the node 14 to support a loopback of the same probe signal. The loopback, as described herein in FIG. 15, can provide additional details for finer granularity of localization of SOP transients. In another exemplary embodiment, the optical line device 30 can be at opposing nodes 12, 14 to support a single polarimeter probe signal which each propagate on the fiber 16, 18, in opposite directions. Variously, the transmitter for the single polarimeter probe signal can be tunable. Where the single polarimeter probe signals from opposing optical line devices 30 counter propagate, the tunable transmitter can tune to different wavelengths for each of the polarization probe signals. In this manner, a virtual loopback is achieved as polarimeter data is obtained from both the opposing optical line devices 30 and this polarimeter data can be used for fault localization in a similar manner as the physical loopback with the optical line device 32.

The optical line devices 30, 32 include various optical line components 50, 52 in addition to the polarimeter 40 and the amplifier 42. The optical line components 50 are shown transmitting on the fiber 16 whereas the optical line component 52 are shown receiving from the fiber 18. The optical line components 50, 52 can be anything integrated within the optical line system such as EDFA amplifiers, Raman amplifiers, OSCs, OTDRs, modems or transceivers, WSSs, or the like. The optical line devices 30, 32 include filters 54, 56 for multiplexing and demultiplexing the polarimeter probe signal with WDM signals, OSC signals, OTDR signals, Raman pumps, and the like. In the optical line device 50, the filter 54 configured to combine an output of the polarimeter 54 with an output of the optical line components 50 and the filter 56 is configured to split the polarimeter probe signal to the polarimeter 40 and the other signals (WDM signals, OSC signals, OTDR signals, Raman pumps, etc.) to the optical line components 52. Similarly, in the optical line device 32, the filter 56 splits the polarimeter probe signal to the amplifier 42 separate from the other signals which are provided to the optical line components 52 and the filter 54 combines an output of the amplifier 42, i.e., the amplified polarization probe signal, with outputs of the optical line components 50. The optical line device 32 is illustrated herein with the amplifier 42, but in other exemplary embodiments, the amplifier 42 may be omitted in lieu of a simple connection forming the loopback function in the optical line device 32. This may be used in cases where amplification is not required for the polarization probe signal to traverse both of the fibers 16, 18, such as in shorter spans.

With respect to integration, the optical line devices 30, 32 can be line cards, Raman amplifier modules, EDFA amplifier modules, OSC modules, OTDR modules, modems, pluggable modules, pizza boxes, and the like. Also, the integrated polarimeter can be realized in a pluggable module that is configured to plug into another hardware device in the optical line system. These hardware devices are part of the optical line system and operate in an integrated manner. That is, these hardware devices support unified management and control, i.e., Operations, Administration, Maintenance, and Provisioning (OAM&P). The polarimeter 40 is able to operate through this unified management and control as well as in-service with WDM traffic-bearing channels, OSC channels, OTDR signals, and the like. The amplifier 42 can be an EDFA, a Semiconductor Optical Amplifier (SOA), Raman amplifier, or the like. Note, depending on the wavelength of the polarimeter probe signal, the amplifier 42 may require different operating bands from conventional EDFAs. Based on the connectivity of the amplifier 42, the optical line device 32 is configured to loop back an amplified polarimeter probe signal, back to the optical line device 30.

The polarimeter 40 includes a transmitter coupled to the filter 54 and a receiver coupled to the filter 56. Note, generally the polarimeter 40 is a receiving device configured to measure the polarization of a test signal. Those of ordinary skill in the art will recognize the integrated polarimeter described herein includes the receiving device and the transmitter for the test signal, i.e., the polarization probe signal. In an exemplary embodiment, the receiver can include any of the various exemplary embodiments shown in FIGS. 6-10. In an exemplary embodiment, the transmitter can be a Distributed Feedback Laser (DFB), such as to provide a single polarization, Continuous Wave (CW) or pulse. The transmitter provides the polarization probe signal at a wavelength which does not interfere with the WDM traffic-bearing channels, OSC channels, OTDR signals, and the like. For example, the WDM traffic-bearing channels may be in the C-band, such as about 1528-1560 nm; of course, other transmission bands are also contemplated. Raman pumps are typically below 1500 nm in the 1400 nm range. The OSC channels, the OTDR wavelengths, and the like can be selected not to interfere with one another and the polarization probe signal. For example, the OSC channels can be 1510 nm, 1625 nm, or the like. In an exemplary embodiment, the polarization probe signal is at 1591 nm to avoid nonlinear interaction with Raman pumps. Of course, other values are also contemplated for the polarimeter 40 and the polarimeter probe signal, so long as the value does not interfere with other signals in the optical line system. In an exemplary embodiment, the polarimeter 40 can share a laser with an OTDR as described herein.

FIG. 4 illustrates the optical line device 34 which is a Raman amplifier with the polarimeter 40 integrated therein along with Raman pumps 60, an OTDR 62, and an OSC 64. The optical line device 34 is a four-port optical device with a line_A_in port 70, a line_A_out port 72, a line_B_out port 74, and a line_B_in port 76. For example, line A could be coupled to the fiber 16 or other optical components and line B could be coupled to the fiber 18 or other optical components. The Raman amplifier 60 includes one or more Raman pumps 78 which are coupled via a filter 80 to counter-propagate out the line_A_in port 70. The filter can be a 14XX filter where XX is the wavelength in the 1400-1500 nm range for the Raman pumps, or the filter can combine any signal below 1500 nm or the like with other signals above 1500 nm. The OTDR 62 can provide back reflection measurements via a DFB laser 82 and a detector 84, such as an avalanche photodiode. The DFB laser 82 and the detector 84 can be coupled to the line_A_in port 70 via a circulator 86 or the like and a filter 88. In an exemplary embodiment, the DFB laser 82 can be 1527 nm; of course, other wavelengths are also contemplated. The OSC 62 can be realized through a pluggable optical transceiver 90 such as a Small Form Factor Pluggable (SFP) or the like. The OSC 62 is both added via a filter 92 and removed via a filter 94 to provide a bi-directional telemetry channel. In an exemplary embodiment, the OSC 62 can operate at 1511 nm; of course, other wavelengths are also contemplated.

The polarimeter 40 includes a receiver 100 and a DFB laser 102. Again, the DFB laser 102 provides the test signal, i.e., the polarization probe signal to the line_B_out port 76 via the filter 54 and receives at the receiver 100 a corresponding test signal from the line_A_in port 70 via the filter 56. Again, in an exemplary embodiment, the DFB laser 102 can be at 1591 nm; of course, other wavelengths are also contemplated. In this exemplary embodiment, the test signal co-propagates with the C-Band for WDM traffic-bearing channels, thereby enabling detection of SOP transients from an upstream polarization probe signal. The receiver 100 contemplates any architecture including the various exemplary embodiments described in FIGS. 6-10. Thus, in the optical line device 34, the Raman amplifier 60, the OTDR 62, the OSC 64, and the polarimeter 40 can operate concurrently as each has a different operating wavelength and each of the operating wavelengths are outside the C-band for WDM traffic-bearing channels.

In FIG. 5, the optical line device 36 is a pluggable module which can be plugged into the optical line system to support dual OTDR and polarimeter functionality. FIG. 5 illustrates two complementary optical line devices 36 connected to one another such as via the fibers 16, 18. The optical line device 36 is configured to operate either as an OTDR or a polarimeter, based on the configuration of switches 110, 112. Note, both the OTDR and the polarimeter can share a DFB laser 114 which can be configured as a pulse for an OTDR mode or a single polarization Continuous Wave (CW) for an SOP mode. The optical line device 36 includes an output port 120 and an input port 122. The DFB laser 114 is coupled to the switch 110 which couples the DFB laser 114 to the output port 120 for the SOP mode and to the input port 122 via a circulator 124 for the OTDR mode to measure back reflections. The input port 122 is coupled to the circulator 124 which connects to either a polarimeter receiver 100 or an OTDR receiver 126 based on the configuration of the switch 112. In an exemplary embodiment, the default operation of the optical line device 36 can be a polarimeter, i.e., the switches 110, 112 connected to the "1" position, with the OTDR mode selectively enabled as needed to measure back reflections.

Integrated Polarimeter

Figure 6:
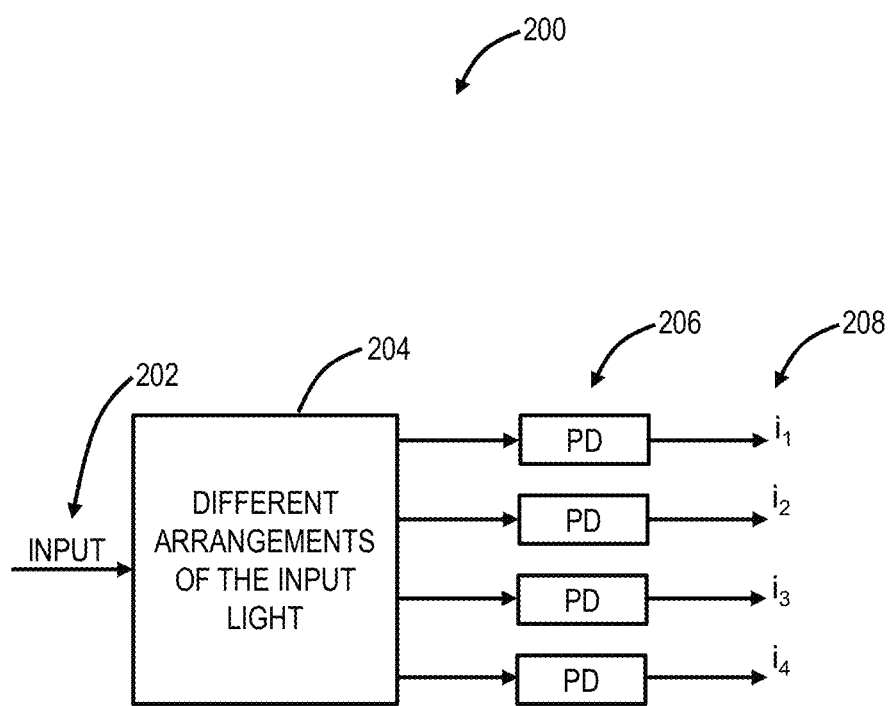
FIG. 6 is a block diagram of a Division of Amplitude Polarimeter (DOAP) which may be used for the integrated polarimeter.

Referring to FIG. 6, in an exemplary embodiment, a block diagram illustrates a Division of Amplitude Polarimeter (DOAP) 200 which may be used for the integrated polarimeter. The DOAP 200 has input light 202 which is variously arranged through different arrangements 204 which output the differently arranged light to four detectors 206 which provide corresponding electrical outputs $i_1$, $i_2$, $i_3$, $i_4$ 208 which are linear projections of the Stokes Parameters of the input light 202. The different arrangements 204 divides the input light 202 into different ways (commonly 4 ways) with different arrangements so that the output photocurrents of the DOAP 200 are the linear projections of the input light 202 SOP. The key technology of the polarimeter is the element realizing the different arrangements 204 of light. Again, the existing approaches of the different arrangements 204 require special design of the bulk free space optics components or of the special coupling functions of the optical fiber. The complexity in the DOAP 200 is the different arrangements 204, and bulk free space optics components or of the special coupling functions of the optical fiber are not amenable to integration into the optical line system.

Figure 7:
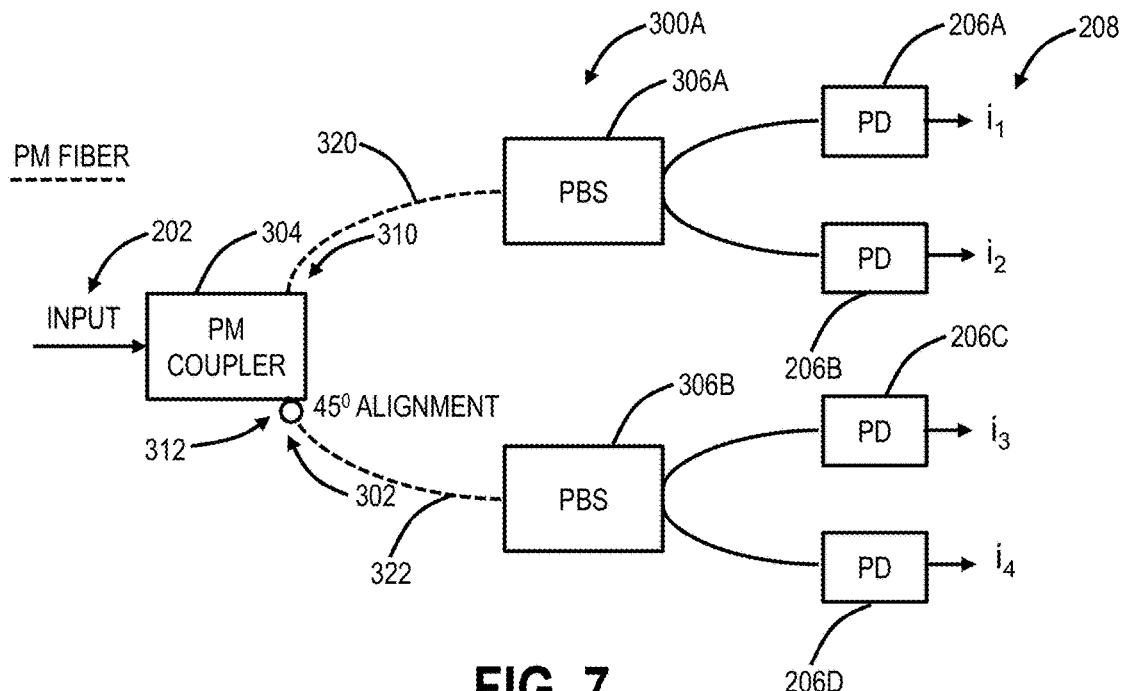
FIG. 7 is a block diagram of a novel, low-cost fiber optics-based integrated polarimeter that can be used with and integrated into components of the optical line system with a 45° alignment coupled to a Polarization Maintaining (PM) coupler.
Figure 8:
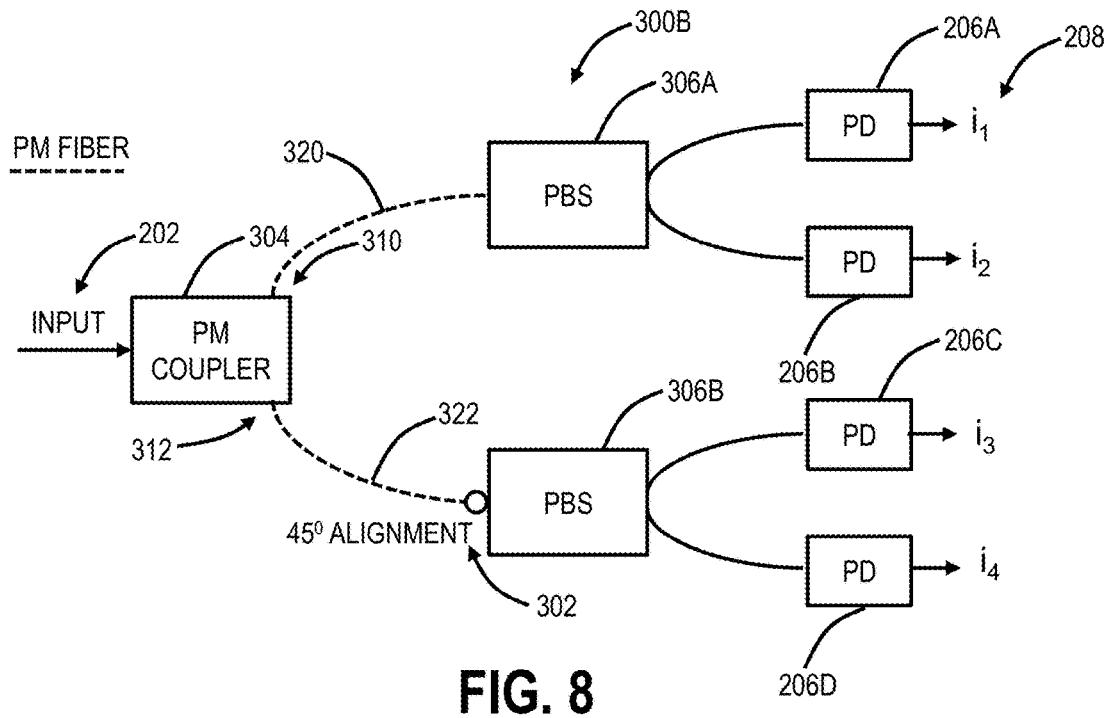
FIG. 8 is a block diagram of another integrated polarimeter similar to the integrated polarimeter of FIG. 7 with the 45° alignment moved to a Polarization Beam Splitter.
Figure 9:
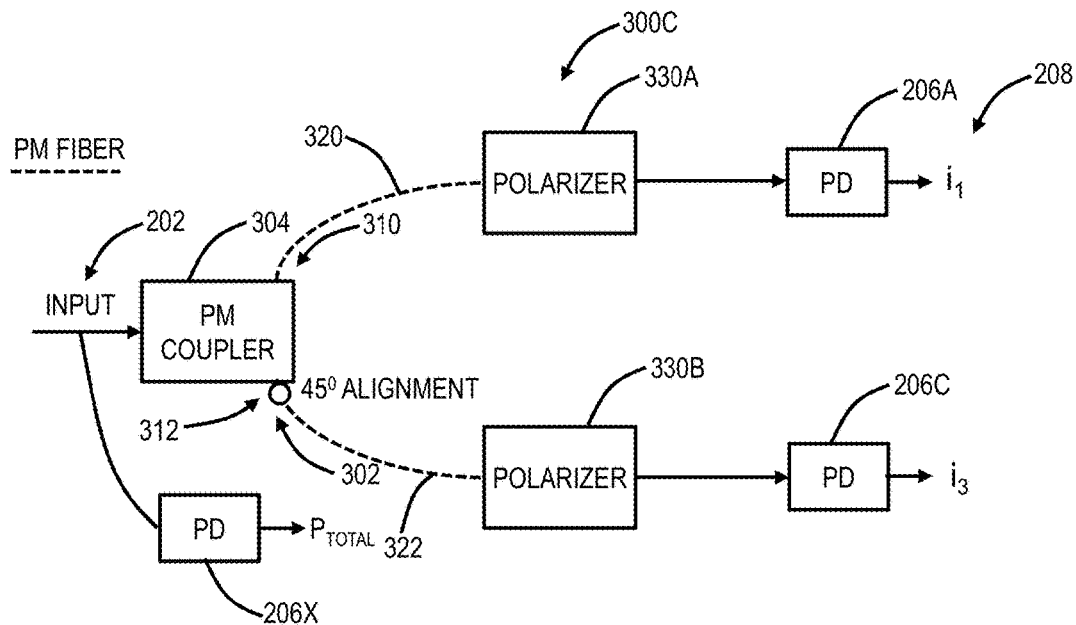
FIG. 9 is a block diagram of yet another integrated polarimeter replacing the Polarization Beam Splitters from the integrated polarimeter of FIG. 7 with Polarizers and adding a total power photodetector tapped from the input of the PM coupler.
Figure 10:
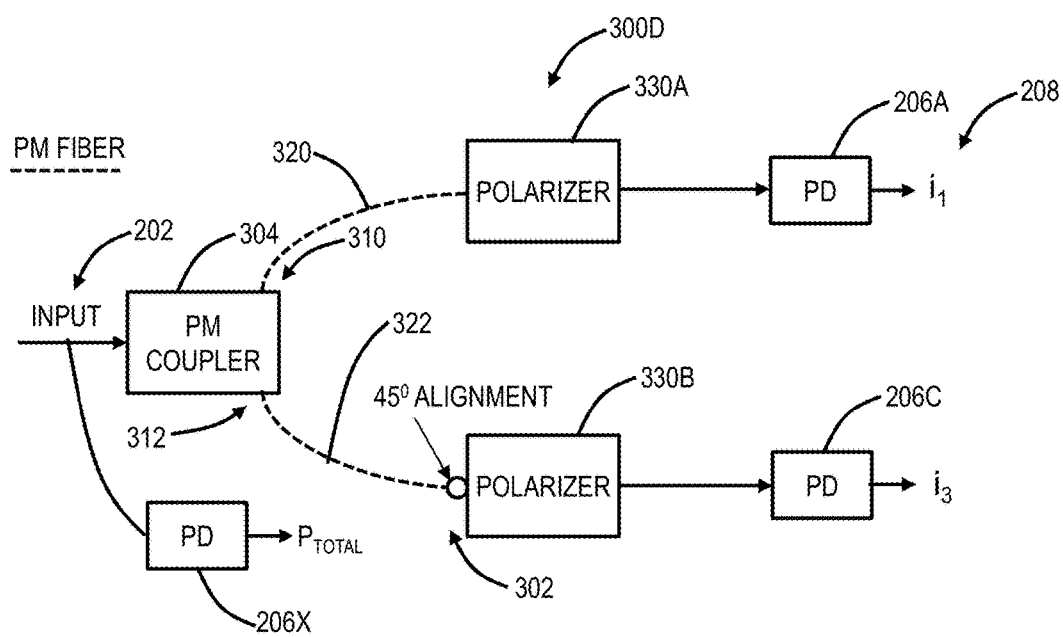
FIG. 10 is a block diagram of yet another integrated polarimeter similar to the integrated polarimeter of FIG. 9 with the 45° alignment moved to a Polarizer.

Referring to FIGS. 7-10, in various exemplary embodiments, block diagrams illustrates a novel, low-cost fiber optics-based integrated polarimeters 300A, 300B, 300C, 300D that can be used with and integrated into components of the optical line system. FIG. 7 is a block diagram of the integrated polarimeter 300A with a 45° alignment 302 coupled to a Polarization Maintaining (PM) coupler 304. FIG. 8 is a block diagram of another integrated polarimeter 300B with the 45° alignment 302 moved to a Polarization Beam Splitter (PBS) 306B. FIG. 9 is a block diagram of yet another integrated polarimeter 300C replacing the two Polarization Beam Splitters in the configuration of FIG. 7 with two polarizers 330A, 330B and adding a total power photodetector 206X which is tapped from the input light 202 prior to the PM coupler 304. FIG. 10 is a block diagram of yet another integrated polarimeter 300D with the 45° alignment 302 moved to a polarizer 330B. Note, each of the integrated polarimeters 300 uses passive, off-the-shelf fiber components, lending itself to integration in the optical line system. Further, the integrated polarimeters 300 use the DOAP 200 configuration.

Each of the integrated polarimeters 300 has the input light 202 connected to a PM coupler 304. In FIG. 7, the input light 202 can include dual polarization light, e.g., X and Y axis or Horizontal and Vertical axis or the like. The PM coupler 304 is configured to split the input light 202 to two identical signals on two outputs 310, 312. The 45° alignment 302 is coupled to the output 302 and configured to rotate the light on the output 312 by 45°. Each of the outputs 310, 312 include PM fiber 320, 322 which maintain the polarization of the light on the outputs 310, 312. The PM fiber 320 is connected to a PBS 306A which splits light on the output 310 into two polarizations, each provided to a PD 206A, 206B to provide the corresponding electrical outputs $i_1$, $i_2$ 208. The PM fiber 322 is connected to the PBS 306B which splits the 45° rotated light into two polarizations, each provided to a PD 206C, 206D to provide the corresponding electrical outputs $i_3$, $i_4$ 208.

The polarization axes of the PM fiber 320 at the output 310 of the PM coupler 304 is 0 degree aligned with the polarization axes of the input signal 202. Therefore, the output of the PBS 306A in the upper arm, $i_1$ and $i_2$, are proportional to the signal power on X-pol and Y-pol. The PM fiber 322 at the output 312 of the PM coupler 304 is 45° degree aligned with the polarization axes of the input signal 202. Therefore, after the following PBS 306B, $i_3$ and $i_4$ are proportional to the signal power on the two polarization axes, which are 45° degree rotated from the polarization axes of the input signal 202. SOP and SOP transient speed can be subsequently calculated by $i_1$~$i_4$ using Eq. 1~8, where |Ex| and |Ey| are the intensity of the signal on the two polarization axes, $\Delta\varphi$ is the phase delay between the signal on the two polarization axes at the Polarimeter input, $\Delta t$ is the sampling time interval.

$$i_1 = |E_x|^2 \quad (1)$$

$$i_2 = |E_y|^2 \quad (2)$$

$$i_3 = \frac{1}{2}(|E_x|^2 + |E_y|^2) + \cos\Delta\varphi |E_x||E_y| \quad (3)$$

$$i_4 = \frac{1}{2}(|E_x|^2 + |E_y|^2) - \cos\Delta\varphi |E_x||E_y| \quad (4)$$

$$S_1 = |E_x|^2 - |E_y|^2 = i_1 - i_2 \quad (5)$$

$$S_2 = 2|E_x||E_y|\cos\Delta\varphi = i_3 - i_4 \quad (6)$$

$$S_3 = 2|E_x||E_y|\sin\Delta\varphi = \sqrt{4 i_1 i_2 - (i_3 - i_4)^2} \quad (7)$$

SOP transient speed = Angular Deflection Between ([S1(n), S2(n), S3(n)]) and ([S1(n+1), S2(n+1), S3(n+1)])/$\Delta t$ (8)

The integrated polarimeters 300B, 300C, 300D are variants of the integrated polarimeter 300A, which can provide additional cost benefits while trading off some performance or functionality, which is acceptable in the optical line system application. The integrated polarimeter 300B moves the 45° alignment 302 from the output 312 of the PM coupler 304 to the input of the PBS 306B, in order to avoid the extra cost for a special configuration of the PM coupler 304. Note, a PBS with 45° alignment at the input is readily available while a PM coupler with 45° alignment requires customization. For this version to be working, the PM fiber 322 between the second output of PM coupler and the PBS has to be as short as possible to eliminate the fast change of birefringence, which will introduce error to SOP tracking of the input light 202.

The integrated polarimeter 300C replaces the two PBSs 306A, 306B with two polarizers 330A, 330B. Assuming 100% Degree of Polarization (DOP) of the input light 202, the two outputs of the PBS 306A, 306B are complementary. Therefore, $i_2$ and $i_4$ can be derived by subtracting $i_1$ and $i_3$ from the total power which is obtained from a detector 206X which is tapped from the input light 202 prior to the PM coupler 304. The integrated polarimeter 300C is less expensive since the polarizers 330 are a lower cost that the PBSs 306. In addition, the integrated polarimeter 300C reduces the amount of high speed high dynamic range receivers (the detectors 206) by 2, which will not only reduce the cost but also reduce the complexity of the electrical circuit for the synchronization, data transmission as well as data storage. For the integrated polarimeter 300C to work, the input light 202 has to be 100% polarized. Note, the integrated polarimeter 300C cannot measure DOP.

The integrated polarimeter 300D is a combination of the integrated polarimeter 300B, 300C. Specifically, the integrated polarimeter 300D is similar to the integrated polarimeter 300C with the polarizers 330 with the 45° alignment 302 from the output 312 of the PM coupler 304 to the input of the polarizer 330B.

Figure 11:
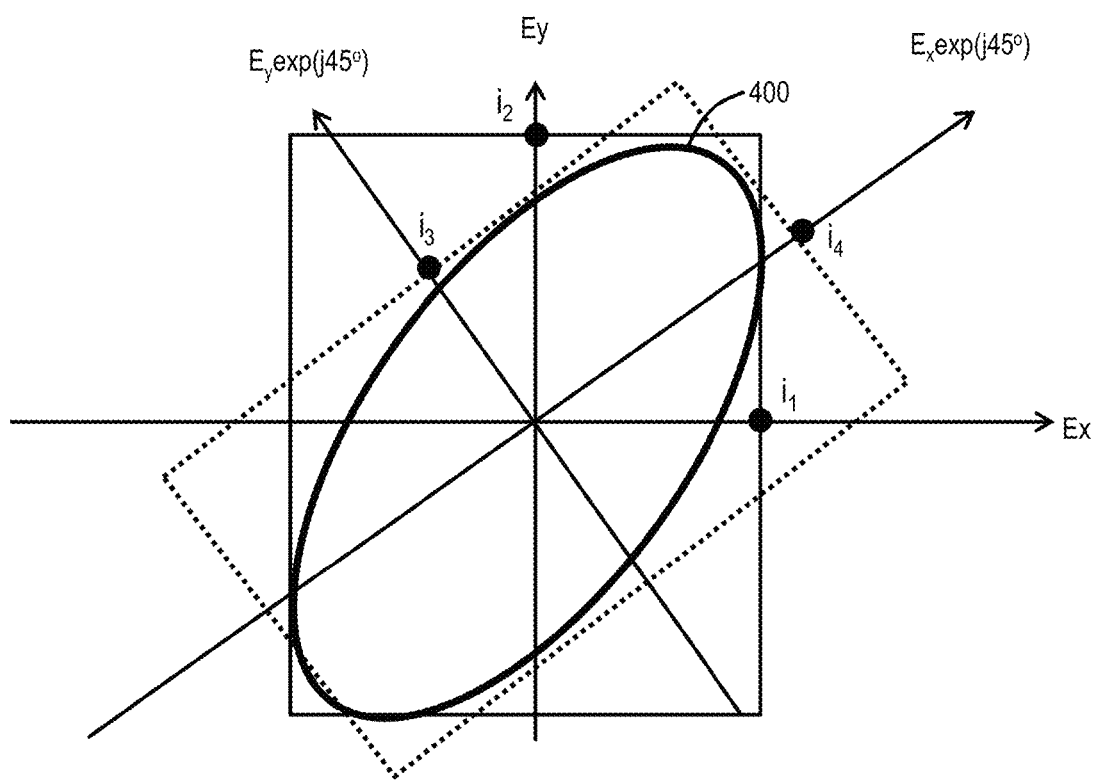
FIG. 11 is a 2D graph of values of the electrical outputs $i_1$, $i_2$, $i_3$, $i_4$ from the DOAP of FIG. 6 and the integrated polarimeter of FIGS. 7-10.

Referring to FIG. 11, in an exemplary embodiment, a 2D graph illustrates values of the electrical outputs $i_1$, $i_2$, $i_3$, $i_4$ 208 from the DOAP 200 and the integrated polarimeter 300. It is noted that all of the integrated polarimeters 300 can only measure the shape of a polarization ellipse 400, but not its direction of rotation, i.e., cannot distinguish between right-handed or left-handed polarization. However, with a faster than Nyquist sampling rate after the receiver, the proposed polarimeter 300 will be able to track the transition of the polarization ellipse during the change of rotating direction. Therefore, it is still able to serve the purpose of fast SOP transient detection. The electrical outputs $i_1$, $i_2$ measure the power on the X and Y polarizations while the electrical outputs $i_3$, $i_4$ measure how "fat" the polarization ellipse 400 is. The integrated polarimeters 300 cannot measure the direction of the circular polarization, i.e., can only project SOP on half of the Poincare sphere.

Output: $i_1 = a_1|Ex|2; i_2 = a_2|Ey|2$;

$i_3 = a_3(\sin 45o|Ey|2 + \cos 45o|Ex|2 + \cos \Delta\varphi|Ex||Ey|)$;

$i_4 = a_4(\sin 45o|Ex|2 + \cos 45o|Ey|2 - \cos \Delta\varphi|Ex||Ey|)$;

SOP: $S1 = |Ex|2 - |Ey|2$ $S2 = 2|Ex||Ey|\cos \Delta\varphi$ $S3 = 2|Ex||Ey|\sin \Delta\varphi$ The integrated polarimeter 300 can compute $\cos \Delta\varphi$ by i1·i4, and $\sin \Delta\varphi$ is computed by $\sin \Delta\varphi = \text{sqrt}(1 - \cos \Delta\varphi^2)$. Thus, the integrated polarimeter 300 cannot tell the "sign" of $\sin \Delta\varphi$. Therefore, S3 can only be projected on the positive side. However, in the optical line application, the objective is to measure SOP speed instead of absolute SOP. The integrated polarimeter 300 is able to accurately measure the SOP speed.

Figure 12:
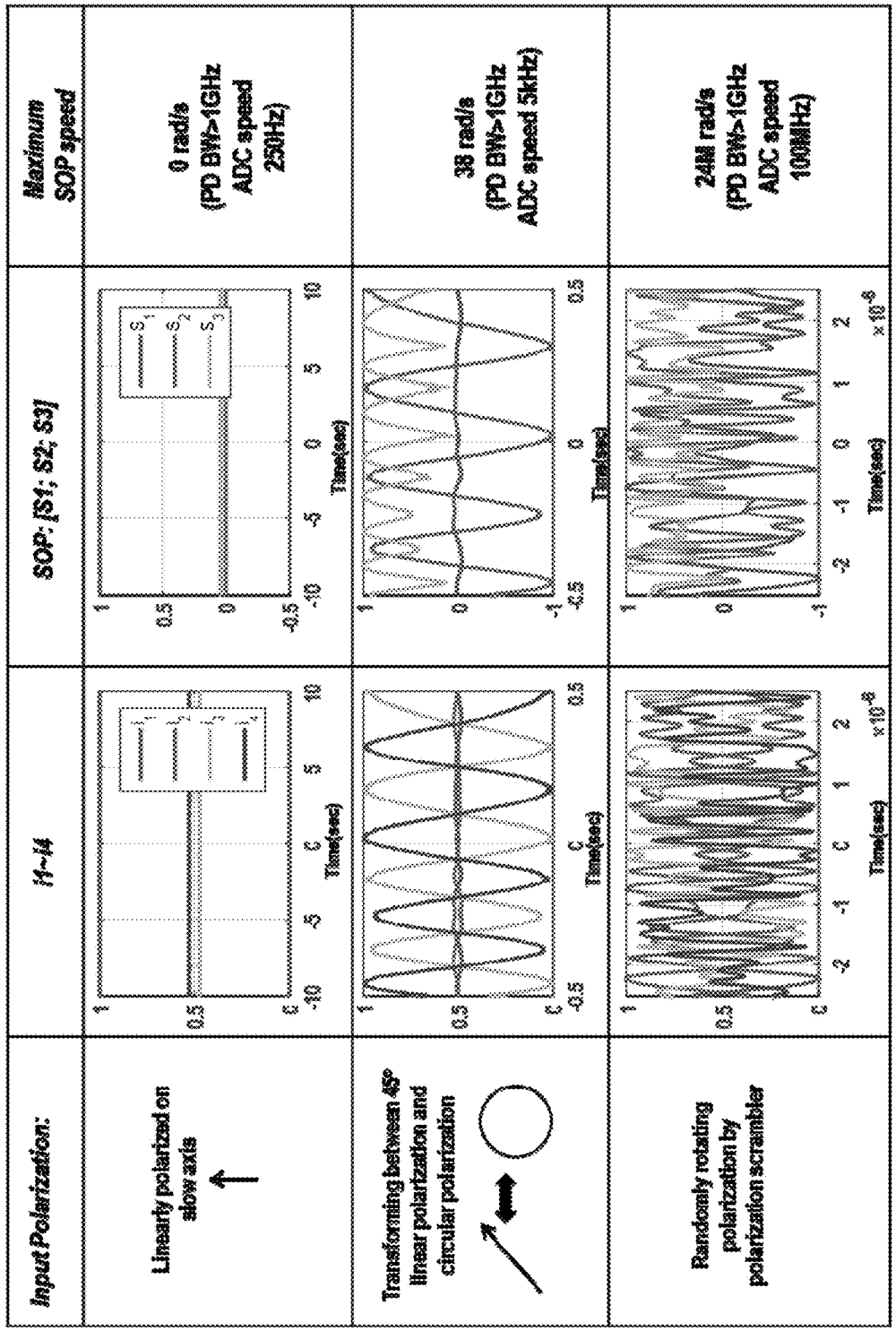
FIG. 12 are graphs in a table illustrate exemplary measurements with the integrated polarimeter for linearly polarized light on a slow axis, polarization transforming between 45° linear polarization and circular polarization, and randomly rotating polarization with a polarization scrambler.
Figure 13:
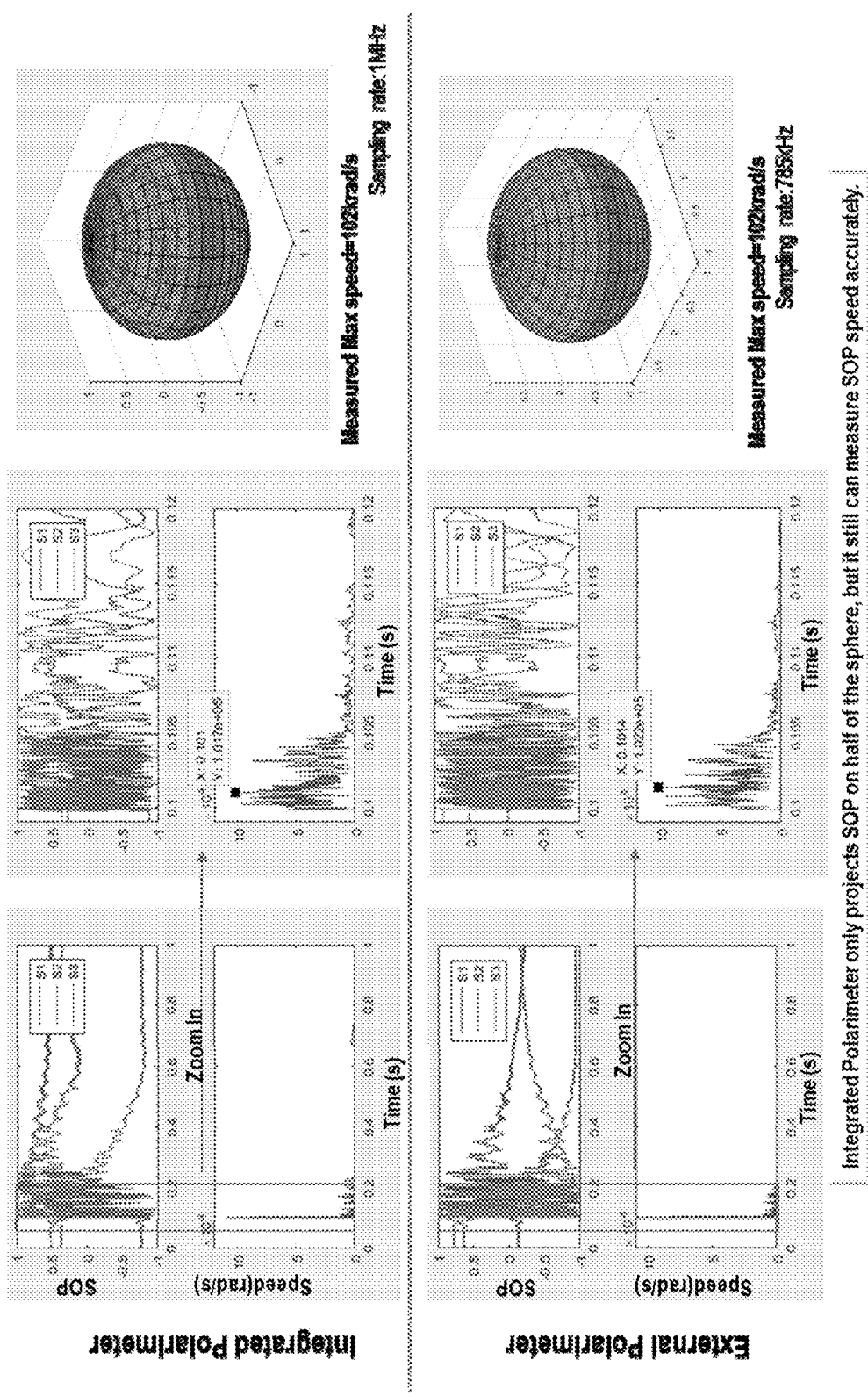
FIG. 13 are graphs of measurements taken by the integrated polarimeter relative to a commercial, external polarimeter to detect a mechanical shock applied to the optical line system.
Figure 14:
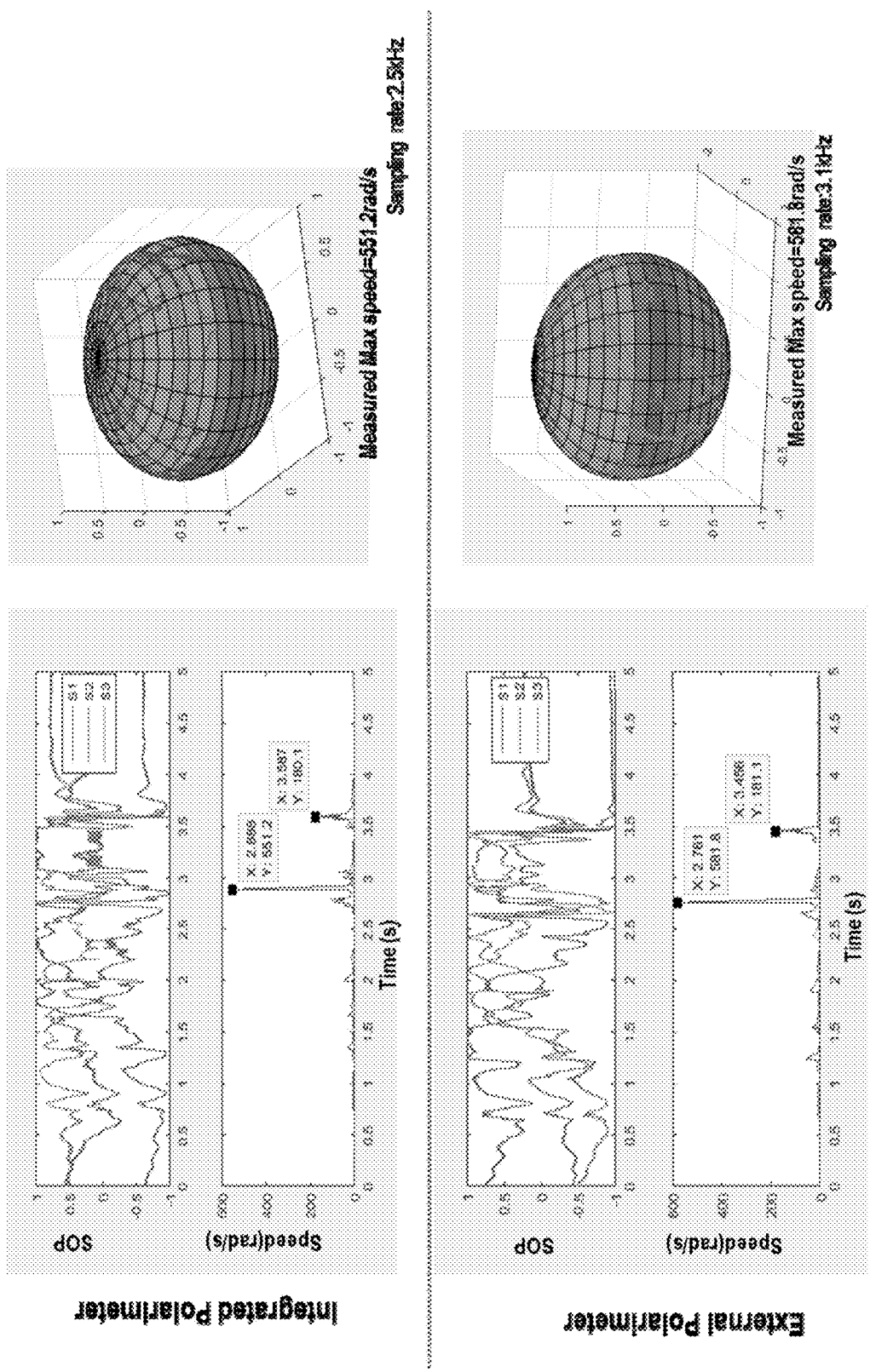
FIG. 14 are graphs of measurements taken by the integrated polarimeter relative to a commercial, external polarimeter to detect hot air applied to the optical line system.

Referring to FIG. 12, in an exemplary embodiment, graphs in a table illustrate exemplary measurements with the integrated polarimeter 300 for linearly polarized light on a slow axis, polarization transforming between 45° linear polarization and circular polarization, and randomly rotating polarization with a polarization scrambler. Referring to FIG. 13, in an exemplary embodiment, graphs illustrate measurements taken by the integrated polarimeter 300 relative to a commercial, external polarimeter to detect a mechanical shock applied to the optical line system. Referring to FIG. 14, in an exemplary embodiment, graphs illustrate measurements taken by the integrated polarimeter 300 relative to a commercial, external polarimeter to detect hot air applied to the optical line system. Note, in both FIGS. 13 and 14, the integrated polarimeter 300 provides similar performance to the commercial, external polarimeter.

Two Fiber Mode Exemplary Setup with the Optical Line Devices 30, 32

Figure 15:
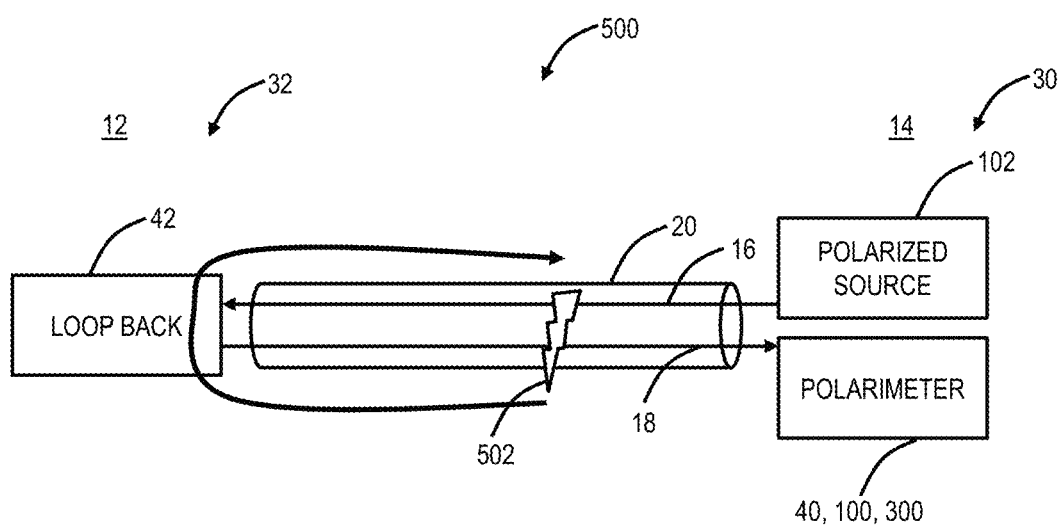
FIG. 15 is a network diagram of an exemplary setup for a two fiber mode in a loop back configuration with the integrated polarimeter to localize the SOP transients.

Referring to FIG. 15, in an exemplary embodiment, a network diagram illustrates an exemplary setup for a two fiber mode in a loop back configuration 500 with the integrated polarimeter to localize the SOP transients. The loopback configuration 500 is described in commonly-assigned U.S. patent application Ser. No. 14/865,802 filed Sep. 25, 2015, and entitled "SYSTEMS AND METHODS USING A POLARIMETER TO LOCALIZE STATE OF POLARIZATION TRANSIENTS ON OPTICAL FIBERS." The loopback configuration 500 can include the optical line device 30 at the node 12 and the optical line device 32 at the node 12. The node 14 includes a polarized source 102 coupled to the fiber 16; a loop back via the amplifier 42 at the node 12 configured to connect the fiber 16 to the fiber 18; and the polarimeter 40, 100, 300 at an end of the fiber 18. A transient 502 occurring on or associated with the bundle 20 carrying both the fibers 16, 18 will thus be observed as two distinct transient excursions at the polarimeter 40, 100, 300. The first observation will propagate from the transient impact of the fiber 18. The transient impact of the fiber 16 will propagate to the amplifier 42, and then along the full length of the fiber 18 to the polarimeter 40, 100, 300, appearing as a second transient on the polarimeter 40, 100, 300. The time difference between these two observed transients is the optical signal propagation time between the SOP transient source on the fiber 16 and the SOP transient source on the fiber 18. This fact allows a determination of the distance of the SOP transient source from the amplifier 42, effectively localizing the SOP transient source.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A polarimeter system integrated into an optical line system, the polarimeter system comprising:
    a transmitter coupled to a transmit filter communicatively coupled to an output port in an optical line device, wherein the transmitter is configured to generate a polarization probe signal, and wherein a wavelength of the polarization probe signal is configured to operate in-service with traffic-bearing channels on the output port; and
    a polarimeter receiver coupled to a receive filter communicatively coupled to an input port in the optical line device, wherein the polarimeter receiver is configured to vary arrangement of input light of a corresponding polarization probe signal from the receive filter and to measure various outputs of the varied arrangement to derive a measurement of State of Polarization (SOP) of the input light,
    wherein the polarimeter system is located at a first node in the optical line system, and wherein the polarimeter system further comprises at a second node, opposite the first node and communicatively coupled thereto by two fibers:
    an amplifier coupled to a second receive filter in a second optical line device, wherein the amplifier is configured to receive the polarization probe signal from the second receive filter, amplify the polarization probe signal, and loop back the polarization probe signal to the polarimeter receiver via a second transmit filter.

2. The polarimeter system of claim 1, wherein the optical line device comprises one or more of a Raman amplifier module, an Erbium Doped Fiber Amplifier (EDFA) module, an Optical Supervisory Channel (OSC) module, an Optical Time Domain Reflectometer (OTDR) module, a modem, and a pluggable module adapted to plug into any of the foregoing modules.

3. The polarimeter system of claim 1, wherein the polarimeter system operates continuously while the optical line system is in-service to collect SOP data over time to detect SOP transients on a specific span in the optical line system based on the collected SOP data over time.

4. The polarimeter system of claim 1, wherein the polarimeter receiver is implemented with a plurality of passive fiber optic components to provide the varied arrangement and a plurality of detectors to measure the various outputs.

5. The polarimeter system of claim 4, wherein the plurality of passive fiber optic components comprises a Polarization Maintaining (PM) coupler configured to receive the input light, PM fiber coupled to outputs of the PM coupler, a 45° alignment associated with one output of the PM coupler, and Polarization Beam Splitters (PBSs) coupled to four detectors for providing $i_1$, $i_2$, $i_3$, and $i_4$.

6. The polarimeter system of claim 4, wherein the plurality of passive fiber optic components comprises a Polarization Maintaining (PM) coupler configured to receive the input light, PM fiber coupled to outputs of the PM coupler, a 45° alignment associated with one output of the PM coupler, polarizers coupled to two detectors for providing $i_1$ and $i_3$, and another detector coupled to an input to provide total input power for estimation of $i_2$ and $i_4$ based on the total power and the measurement of $i_1$ and $i_3$.

7. The polarimeter system of claim 1, wherein the optical line device comprises the polarimeter system and an Optical Time Domain Reflectometer (OTDR), wherein the transmitter is shared between the polarimeter system and the OTDR based on configuration.

8. The polarimeter system of claim 1, wherein the wavelength of the polarization probe signal is outside of the C-band, greater than 1500 nm to avoid Raman pump lasers, and different from wavelengths for Optical Supervisory Channels (OSCs).

9. A polarimeter system integrated into an optical line system, the polarimeter system comprising:
a transmitter coupled to a transmit filter communicatively coupled to an output port in an optical line device, wherein the transmitter is configured to generate a polarization probe signal, and wherein a wavelength of the polarization probe signal is configured to operate in-service with traffic-bearing channels on the output port; and
a polarimeter receiver coupled to a receive filter communicatively coupled to an input port in the optical line device, wherein the polarimeter receiver is configured to vary arrangement of input light of a corresponding polarization probe signal from the receive filter and to measure various outputs of the varied arrangement to derive a measurement of State of Polarization (SOP) of the input light,
wherein the polarimeter system operates continuously while the optical line system is in-service to collect SOP data over time to detect SOP transients on a specific span in the optical line system based on the collected SOP data over time,
wherein the polarimeter system is located at a first node in the optical line system, and wherein the polarimeter system further comprises at a second node, opposite the first node and communicatively coupled thereto by two fibers;
an amplifier coupled to a second receive filter in a second optical line device, wherein the amplifier is configured to receive the polarization probe signal from the second receive filter, amplify the polarization probe signal, and loop back the polarization probe signal to the polarimeter receiver via a second transmit filter.

10. The polarimeter system of claim 9, wherein the optical line device comprises one or more of a Raman amplifier module, an Erbium Doped Fiber Amplifier (EDFA) module, an Optical Supervisory Channel (OSC) module, an Optical Time Domain Reflectometer (OTDR) module, a modem, and a pluggable module adapted to plug into any of the foregoing modules.

11. The polarimeter system of claim 9, wherein the polarimeter receiver is implemented with a plurality of passive fiber optic components to provide the varied arrangement and a plurality of detectors to measure the various outputs.

12. The polarimeter system of claim 9, wherein the wavelength of the polarization probe signal is outside of the C-band, greater than 1500 nm to avoid Raman pump lasers, and different from wavelengths for Optical Supervisory Channels (OSCs).

13. A polarimeter system integrated into an optical line system, the polarimeter system comprising:
a transmitter coupled to a transmit filter communicatively coupled to an output port in an optical line device, wherein the transmitter is configured to generate a polarization probe signal, and wherein a wavelength of the polarization probe signal is configured to operate in-service with traffic-bearing channels on the output port; and
a polarimeter receiver coupled to a receive filter communicatively coupled to an input port in the optical line device, wherein the polarimeter receiver is configured to vary arrangement of input light of a corresponding polarization probe signal from the receive filter and to measure various outputs of the varied arrangement to derive a measurement of State of Polarization (SOP) of the input light,
wherein the polarimeter receiver is implemented with a plurality of passive fiber optic components to provide the varied arrangement and a plurality of detectors to measure the various outputs, and
wherein the plurality of passive fiber optic components comprises a Polarization Maintaining (PM) coupler configured to receive the input light, PM fiber coupled to outputs of the PM coupler, a 45° alignment associated with one output of the PM coupler, polarizers coupled to two detectors for providing $i_1$ and $i_3$, and another detector coupled to an input to provide total input power for estimation of $i_2$ and $i_4$ based on the total power and the measurement of $i_1$ and $i_3$.

14. The polarimeter system of claim 13, wherein the polarimeter system is located at a first node in the optical line system, and wherein the polarimeter system further comprises at a second node, opposite the first node and communicatively coupled thereto by two fibers:
an amplifier coupled to a second receive filter in a second optical line device, wherein the amplifier is configured to receive the polarization probe signal from the second receive filter, amplify the polarization probe signal, and loop back the polarization probe signal to the polarimeter receiver via a second transmit filter.

15. The polarimeter system of claim 13, wherein the optical line device comprises one or more of a Raman amplifier module, an Erbium Doped Fiber Amplifier (EDFA) module, an Optical Supervisory Channel (OSC) module, an Optical Time Domain Reflectometer (OTDR) module, a modem, and a pluggable module adapted to plug into any of the foregoing modules.

16. The polarimeter system of claim 13, wherein the optical line device comprises the polarimeter system and an Optical Time Domain Reflectometer (OTDR), wherein the transmitter is shared between the polarimeter system and the OTDR based on configuration.

17. The polarimeter system of claim 13, wherein the wavelength of the polarization probe signal is outside of the C-band, greater than 1500 nm to avoid Raman pump lasers, and different from wavelengths for Optical Supervisory Channels (OSCs).

* * * * *